(12) United States Patent
Ritch

(10) Patent No.: US 9,482,930 B1
(45) Date of Patent: Nov. 1, 2016

(54) GLOVE MOUNT FOR GOPRO® CAMERA DURING SCUBA DIVING

(71) Applicant: Daniel G. Ritch, Aiea, HI (US)

(72) Inventor: Daniel G. Ritch, Aiea, HI (US)

(*) Notice: Subject to any disclaimer, the term of this patent is extended or adjusted under 35 U.S.C. 154(b) by 0 days.

(21) Appl. No.: 14/986,100

(22) Filed: Dec. 31, 2015

(51) Int. Cl.
G03B 17/56 (2006.01)
A41D 19/00 (2006.01)

(52) U.S. Cl.
CPC ......... *G03B 17/561* (2013.01); *A41D 19/0037* (2013.01); *A41D 19/0024* (2013.01)

(58) Field of Classification Search
CPC .................................................. G03B 17/561
See application file for complete search history.

(56) References Cited

U.S. PATENT DOCUMENTS 6,487,439 B1 * 11/2002 Skladnev ............. A61B 5/0059
356/41

| 2004/0200868 | A1 * | 10/2004 | Woodman | A45C 11/38 224/221 |
| 2006/0038917 | A1 * | 2/2006 | Funato | H04N 5/232 348/376 |
| 2012/0327256 | A1 * | 12/2012 | Robson | G02B 27/0172 348/211.99 |
| 2013/0085325 | A1 * | 4/2013 | Fuller | A61B 1/00147 600/102 |
| 2013/0184033 | A1 * | 7/2013 | Willenborg | H04M 1/04 455/557 |
| 2015/0286117 | A1 * | 10/2015 | Sung | A42B 3/04 224/191 |
| 2015/0323858 | A1 * | 11/2015 | Stephens | F16M 13/04 396/423 |
| 2016/0054645 | A1 * | 2/2016 | Contino | G03B 17/561 348/211.99 |
| 2016/0131963 | A1 * | 5/2016 | Clearman | G03B 17/561 224/267 |

* cited by examiner

*Primary Examiner* — Wib Perkey
(74) *Attorney, Agent, or Firm* — Paul R. Martin

(57) ABSTRACT

A GoPro® pivoting/swivel mount that is securely integrated with high quality Mechanix® type gloves that are used for diving.

5 Claims, 4 Drawing Sheets

GLOVE MOUNT FOR GOPRO® CAMERA DURING SCUBA DIVING

TECHNICAL FIELD OF THE INVENTION

The present invention relates to the general art of swimming accessories, and to the particular field of scuba diving accessories.

BACKGROUND OF THE INVENTION

The problem of conveniently carrying, accessing, and using a camera under various operating conditions has existed since the beginning of hand-held photography. With the spread of digital photography, which allows inexpensive photograph storage and capture, more individuals are exposed to the inherent limitations that camera securement imposes during periods of activity. Fast-paced and strenuous physical activities such as surfing, jogging, mountain climbing, snowboarding, and skydiving often require the individual to fully concentrate on the activity rather than on capturing photographs or video. Furthermore, such activities often leave the participant without a free hand to operate the camera.

The problem of conveniently carrying, accessing, and using a camera under various operating conditions has existed since the beginning of hand-held photography. It has become even more of a problem in recent years as a growing number of photographers attempt to take action photographs while participating in fast-paced physical activities such as surfing, snorkeling, skiing, mountain biking, kayaking, rafting and so on. Activities such as these often leave a photographer without pockets, purses, or even enough time to fetch a camera from such a place if he or she hopes to get a photo of the action while it is occurring.

Even in the event that a photographer is able to quickly access a camera during such an activity, an accidental fall or change of circumstances could make it difficult for the photographer to hold on to the camera. The camera could be damaged, broken or lost altogether in the event that the photographer might quickly need both of his or her hands free to ensure his or her safety. It is possible that people would take more photographs, and even better photographs, during their favorite physical activities if there was a convenient way for them to carry, quickly access, and then securely use a camera at such a time.

Another problem with taking photographs during fast-paced physical activities is the question of what to do with the camera after a photograph has been taken. For example, a surfing photographer taking a photograph of a breaking wave might quickly need his or her hands free to push their surfboard under the wave after taking the photograph. Perhaps a rafting photographer wants to photograph the harrowing view of the rapids just before entering them, but he or she might immediately thereafter need both hands free to brace themselves or to steer the raft. In either case, the photographer may not have enough time to securely store the camera after taking a photograph.

Additionally, the photographer might just prefer to have the camera immediately out of the way so that he or she can enjoy the given activity without the hassle of stowing their camera. Whatever the circumstance, there is currently no solution that solves the problems associated with conveniently carrying, quickly accessing, securely using and then quickly stowing a camera during periods of physical activity such as surfing, snorkeling, kayaking, rafting, etc.

There have been attempts to provide a solution to these problems. For years, rubber bands and wrist or neck ropes have been included with new cameras in an effort to provide the photographer with a convenient way to carry the camera. While this may suffice for a walk in the park, surfing a wave or rafting the rapids with a camera swinging wildly from one's wrist or neck is a less than ideal or safe way to carry a camera while participating in such an activity. Either the photographer, the camera, or people nearby may be harmed by the swinging camera.

The camera could be easily lost if the photographer is unable to adequately clutch the rubber band or nylon strap draped around their wrist. And while this method of carrying a camera does provide for immediate access to the camera, it unfortunately does not allow the user to have both hands free for participating in the given activity when the camera is not needed. In this way, a simple rubber band or nylon strap solution handicaps the photographer's participation in and enjoyment of the given activity and to a certain extent sacrifices their own safety and the safety of the camera.

Hence, conventional devices or solutions fail to provide adequate means for a photographer to conveniently carry, access, securely hold and use, and then quickly stow away a camera while participating in a physical activity. Therefore, there is a need for a solution that allows for carrying a camera in a further secured position, provides quick access to for holding and using the camera while still remaining secured to the user, and then quickly stowing the camera into the aforementioned further secured position.

Under water photography has become popular in recent years, especially with the introduction of inexpensive, one time use, waterproof cameras such as Kodak's "Max Sport" camera. During the process of swimming it is necessary for a person to use both hands and arms to help propel him or herself through the water. Carrying a camera becomes problematic because it forces the user to relinquish one hand to the job of carrying the camera. The camera may be carried in a pocket on the user's swimming outfit, or may be retained by means of a lanyard that attaches to the camera at one end and wraps around the users wrist or neck, unfortunately, these retaining means tend to be problematic in that the user must pull the camera out of a pocket or must retrieve that camera from its lanyard and position the camera for taking a photo, a time consuming process that may cause the user to be too slow in taking a photo of a moving object such as a fish. Additionally, there may be other applications for a wrist mounted camera holder under other conditions such as during sports activities or other applications where the user wants to use a camera for quick photo opportunities while having both hands free when not using the camera.

Therefore, there is a need for a means for mounting a camera, such as a GoPro® camera, on a swimmer or diver in a secure manner which is convenient for use and does not unduly interfere with the swimming activity.

SUMMARY OF THE INVENTION

The above-discussed disadvantages of the prior art are overcome by a GoPro® pivoting/swivel mount that is securely integrated with high quality Mechanix® type gloves that are used for diving.

The preferred form of the device embodying the present invention will co-operate with a GoPro® camera mount that is attached to gloves, thus enabling a diver to film left or right handed, and be able to move the camera easily during a dive or any activity. The mount in the preferred form of the invention is a 360° swivel GoPro® mount.

The device of the present invention can be used for any activity that doesn't require the use of one's hands. There are limitless uses of the device when diving, climbing, surfing, skating, skydiving, cycling, hunting, shooting, etc. The device will provide protection against chaffing and will offer a feasible way to film while doing activities.

The preferred form of this invention is a tool for scuba diving. Typically, GOPRO® cameras are mounted to the top of a user's head. When scuba diving, there is no way to know exactly what the diver is filming when under water. By mounting the camera to a glove since the swimmer is swimming with arms fully extended the swimmer always have direct visual contact to what he is filming. For the fact the swimmer's arms are fully extended anyway, this product is perfect for the scuba diver to continually see what he is filming.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
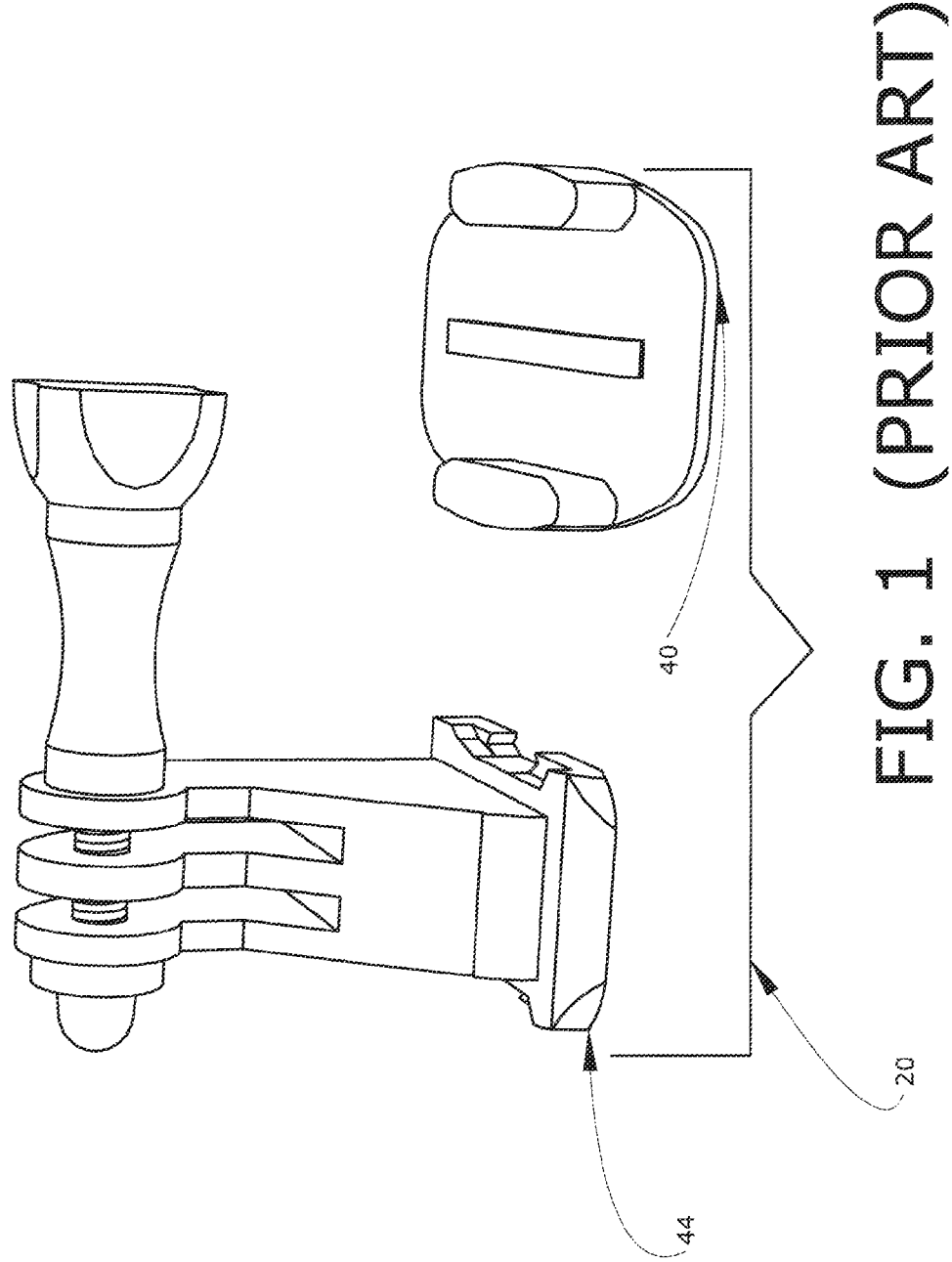
FIG. 1 shows a GoPro® camera and mount which will be mounted on a glove using the unit embodying the present invention.

Referring to the figures, it can be understood that the present invention is embodied in a unit 10 for mounting a GoPro® camera unit 20 on a glove 30 which is worn by a swimmer, such as a SCUBA diver to record his or her surroundings during the swim. The GoPro® camera unit is well known and therefore will not be discussed in detail. Unit 20 includes a mount 40 having an adhesive surface 42 for securely mounting camera support 44 on a chosen surface. Mount 40 is an accessory commonly supplied by GoPro® and support 44 is also an accessory commonly supplied by GoPro® for mounting the camera. Those skilled in the art will understand how mount 40 cooperates with camera support 44 to support a camera; therefore, these details will not be provided.

Figure 2:
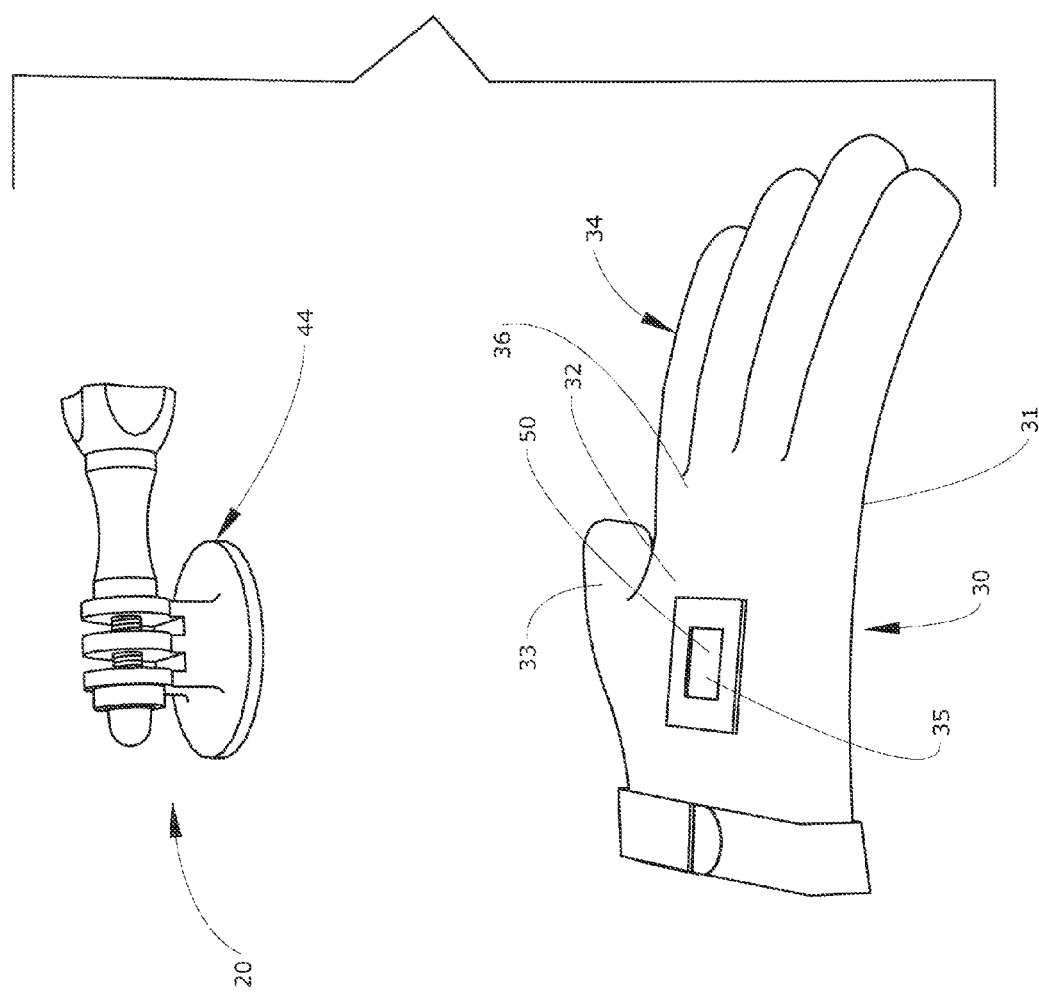
FIG. 2 shows the GoPro® camera in combination with a glove to which it will be mounted using the unit embodying the present invention
Figure 3:
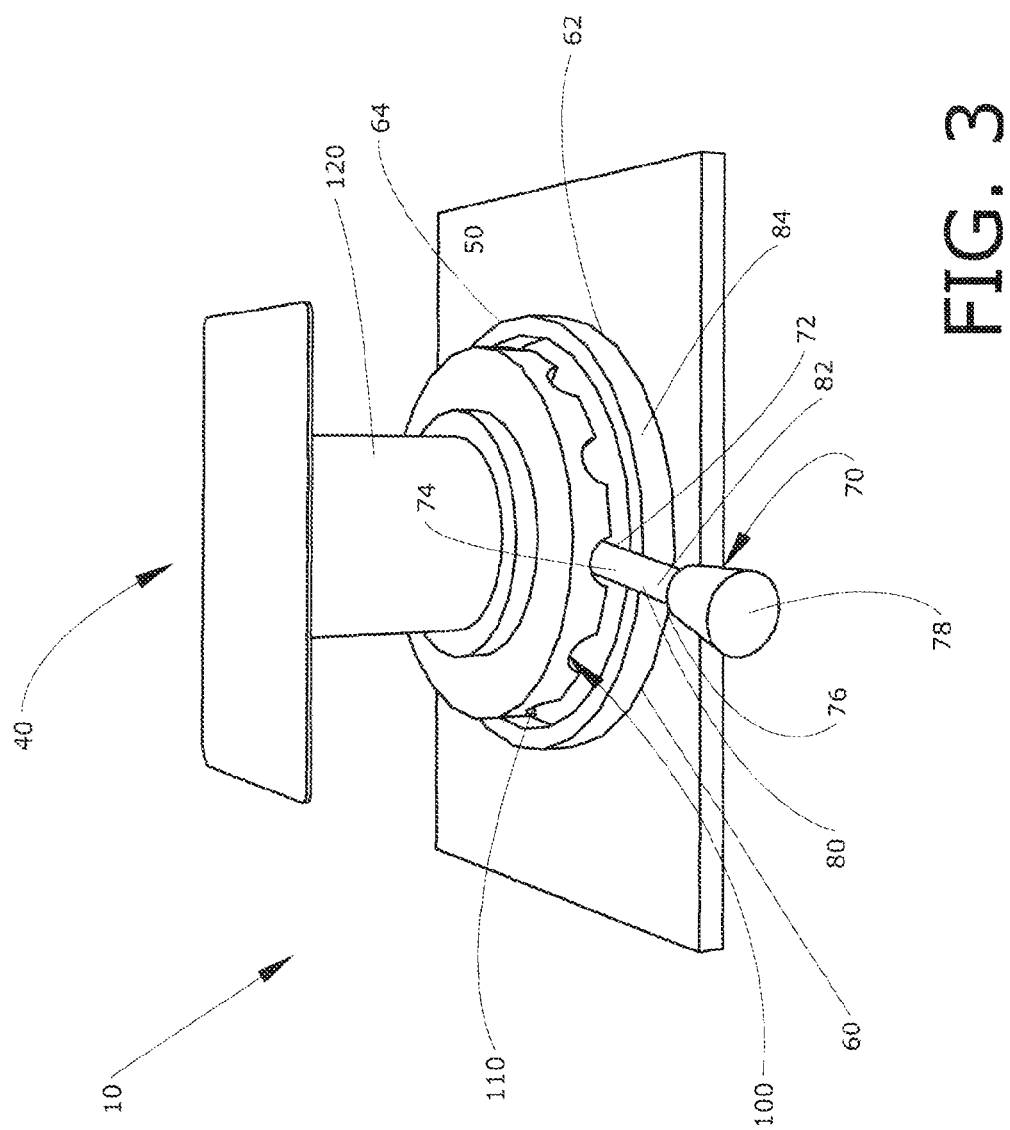
FIG. 3 is a shows the unit embodying the present invention.

Referring to FIGS. 2 and 3 it can be understood that glove 30 has a palm portion 31, a back portion 32, a thumb portion 33, a finger portion 34, an inside surface 35, and an outside surface 36. The unit 10 for mounting a GoPro® camera on the glove comprises a base 50 which is securely mounted on the inside surface of the glove on the back portion of the glove adjacent to the thumb portion. An arcuate rail 60 has a bottom rim 62 securely affixed to the base, a top rim 64 spaced apart from the base and from the top surface of the back portion of the glove. The rim extends for 360°, but only a portion of the rim is shown in FIG. 3 for the sake of clarity.

A spring-biased locking pin 70 is mounted on the rail. The locking pin has a body 72 which extends through the rail and a proximal end 74 located within the perimeter of the rail and a distal end 76 located outside the perimeter of the rail. A head 78 is on the distal end of the locking pin. The locking pin includes a spring element 80 which at one end engages the rail and at another end engages an abutment 82 on the body of the pin and biases the pin radially inwardly of the arcuate rail as indicated by arrow 84. The pin is withdrawn by pulling on the head against the bias of the spring for a purpose which will be understood from the teaching of this disclosure.

A swivel element 100 is rotatably mounted on the base to rotate inside the circumference of the arcuate rail. The swivel element extends through the glove and has a plurality of angularly spaced-apart grooves thereon, such as groove 110. The grooves are located on the swivel element to cooperate with the proximal end of the locking pin to lock the swivel element in a chosen position by engaging the locking pin in a chosen groove. In this manner, the orientation of the camera can be selected and adjusted in two planes: in the horizontal plane by using unit 10 and in the vertical plane by using the GoPro®-supplied adjustment accessory.

A mounting element 120 is located on the swivel element having a top surface on which the mount 40 of the GoPro® camera can be affixed. Adhesive 130 can be located on mounting element 120 to secure mount 40 to mounting element 120.

Figure 4:
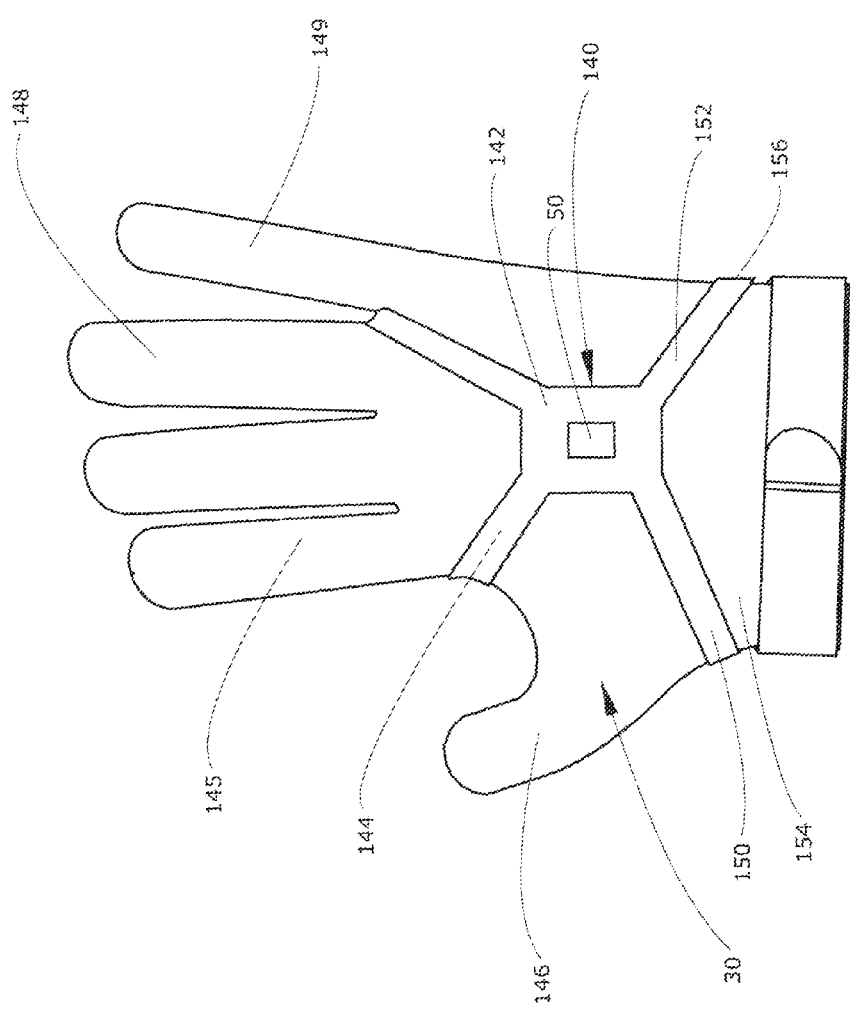
FIG. 4 shows a support brace that can be used in conjunction with the unit embodying the present invention.

The glove can include a reinforcing brace 140 shown in FIG. 4, integrated with the body and material of the glove to provide extra support for the unit 10 with the base of the unit being secured to the brace. The brace is X-shaped and includes a main portion 142 located to support base 50 on the back of the wearer's hand, a first strap portion 144 which extends around the hand between the first digit 145 of the fingers and thumb 146, a second strap portion 147 which extends around the hand adjacent to the fingers opposite to the thumb to extend between the third digit 148 and fourth digit 149 (with the fourth digit being commonly known as the little finger and the third digit being the digit immediately adjacent to the little finger), a third strap portion 150 which extends around the hand between the base of the thumb and the wrist, and a fourth strap portion 152 which extends between the fourth digit 149 (the little finger) and the wrist 154 on the heel of the hand 156. The brace is X-shaped with the base engaging portion in the middle and the straps defining the X-shape. The reinforcing brace can be formed of any suitable material.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A unit for mounting a GoPro® camera on a glove comprising:

A) a glove having a palm portion, a back portion, a thumb portion and a finger portion;

B) a base which is securely mounted on the back portion of the glove adjacent to the thumb portion;
C) an arcuate rail having a bottom rim securely affixed to the base, a top rim spaced apart from the base and from the back portion of the glove;
D) a spring-biased locking pin mounted on the rail, the locking pin extending through the rail and being spring-biased radially inwardly of the arcuate rail;
E) a swivel element rotatably mounted on the base to rotate inside the circumference of the arcuate rail, the swivel element having a plurality of grooves thereon, the grooves being located on the swivel element to cooperate with the locking pin to lock the swivel element in a chosen position by engaging the locking pin in a chosen groove; and
F) a mounting element on the swivel element having a top surface on which a GoPro® camera can be mounted.

2. The unit defined in claim 1 wherein the arcuate rail extends for 360°.

3. The unit defined in claim 1 wherein the locking pin includes a head located outside the rail.

4. The unit defined in claim 1 wherein the glove has an inside surface and an outside surface, and the base is secured to the inside surface and the swivel element projects through the glove so the mounting element on the swivel element is located spaced apart from the outside of the glove.

5. The unit defined in claim 1 further including an X-shaped support brace integral with the glove, the base being mounted on the X-shaped brace.

* * * * *